US008438115B2

(12) United States Patent
Pauly et al.

(10) Patent No.: US 8,438,115 B2
(45) Date of Patent: May 7, 2013

(54) METHOD OF SECURING POSTAGE DATA RECORDS IN A POSTAGE PRINTING DEVICE

(75) Inventors: Steven J. Pauly, New Milford, CT (US); Michael J. Shukaitis, Cromwell, CT (US)

(73) Assignee: Pitney Bowes Inc., Stamford, CT (US)

( * ) Notice: Subject to any disclaimer, the term of this patent is extended or adjusted under 35 U.S.C. 154(b) by 2318 days.

(21) Appl. No.: 11/234,050

(22) Filed: Sep. 23, 2005

(65) Prior Publication Data

US 2007/0073628 A1 Mar. 29, 2007

(51) Int. Cl.
*G06Q 20/00* (2012.01)

(52) U.S. Cl.
USPC ................. 705/62; 705/60; 705/61; 705/400; 705/401; 705/402; 705/403; 705/404; 705/405; 380/273

(58) Field of Classification Search ............. 705/60–62, 705/400–405; 380/273
See application file for complete search history.

(56) References Cited

U.S. PATENT DOCUMENTS

| | | | | |
|---|---|---|---|---|
| 4,760,532 | A * | 7/1988 | Sansone et al. | 705/403 |
| 5,666,421 | A * | 9/1997 | Pastor et al. | 380/51 |
| 5,892,900 | A * | 4/1999 | Ginter et al. | 726/26 |
| 6,009,177 | A * | 12/1999 | Sudia | 713/191 |
| 6,041,317 | A | 3/2000 | Brookner | |
| 6,252,959 | B1 * | 6/2001 | Paar et al. | 380/28 |
| 6,466,921 | B1 * | 10/2002 | Cordery et al. | 705/60 |
| 6,868,407 | B1 * | 3/2005 | Pierce | 705/60 |
| 6,973,191 | B2 * | 12/2005 | Audebert et al. | 380/277 |
| 2002/0018569 | A1 * | 2/2002 | Panjwani et al. | 380/247 |
| 2005/0123142 | A1 * | 6/2005 | Freeman et al. | 380/277 |
| 2007/0071237 | A1 * | 3/2007 | Brown et al. | 380/30 |
| 2008/0031460 | A1 * | 2/2008 | Brookner et al. | 380/282 |

FOREIGN PATENT DOCUMENTS

| | | |
|---|---|---|
| WO | 02/37736 A2 | 5/2002 |
| WO | 03/081549 A2 | 10/2003 |

OTHER PUBLICATIONS

Bruce Schneier, "Applied Cryptography", Copyright 1996, Jonhn Wiley & Sons, Inc., section 2.6 Digital Signatures, pp. 34-41.*

* cited by examiner

*Primary Examiner* — Steven Kim
(74) *Attorney, Agent, or Firm* — Brian A. Lemm; Charles R. Malandra, Jr.; Steven J. Shapiro

(57) ABSTRACT

In a system including a postage printing device and a data center, wherein the postage printing device and the data center have a first set of keys for use in requesting and downloading a plurality of postage data records from the data center for use in printing postal indicia, a method of securely transferring the postage printing device and any postage value stored therein from a first user to a second user. According to the method, a new set of keys for requesting and downloading postage data records is generated, any current postage value stored in the printer device is securely transferred to the second user using the new keys and some of the first set of keys, and the first set of keys is zeroed, thereby protecting the first user from any potential theft or fraud of postage funds on the part of the second user.

4 Claims, 4 Drawing Sheets

METHOD OF SECURING POSTAGE DATA RECORDS IN A POSTAGE PRINTING DEVICE

FIELD OF THE INVENTION

The present invention relates to the securing of postage value, and in particular to a method of securing postage data records stored in a postage printing device that represent such postage value when the postage printing device is transferred from one user to another.

BACKGROUND OF THE INVENTION

Postage metering systems are well known in the art. A postage metering system applies evidence of postage, commonly referred to as postal indicium, to an envelope or other mailpiece (directly or on a label to be applied thereto) and accounts for the value of the postage dispensed.

Presently, there are two basic postage metering system types: closed systems and open systems. In a closed system, the system functionality is solely dedicated to postage metering activity. Examples of closed metering systems include conventional digital and analog (mechanical and electronic) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open metering systems include personal computer (PC) based devices with single/multi-tasking operating systems, multi-user applications and digital printers. Open system indicia printed by the non-dedicated printer are made secure by including addressee information in the encrypted evidence of postage printed on the mailpiece for subsequent verification.

Conventional analog closed system postage meters (both mechanical and electronic) have heretofore physically secured the link between printing and accounting. The integrity of the physical meter box has been monitored by periodic inspections of the meters. Digital closed system postage meters typically include a dedicated digital printer coupled to a device that provides metering (accounting) functionality. Digital printing postage meters have removed the need for the physical inspection that was required with analog systems by cryptographically securing the link between the accounting and printing mechanisms.

In such digital closed systems, the dedicated printer and the metering (accounting) device may be located in the same device and/or at the same location when placed in operation. Alternatively, the dedicated printer may be located in a first location (i.e., the local location where indicia are to be printed), and the metering (accounting) device may be located in a remote location, such as a provider's data center. In the latter situation, it is still necessary for the dedicated printer to be a secure device having cryptographic capabilities so that postage printing information, such as an indicium, received from the metering (accounting) device, and the metering (accounting) device itself, can be authenticated.

One particular implementation of a closed system includes a secure postage printing device that stores and prints indicia for specific postage denominations that were previously dispensed by an approved postal security device (PSD) associated with a data center. In operation, a user sends a request to purchase postage to the data center in the form of a request for a particular number of indicia for one or more particular postage denominations (e.g., twenty $0.37 indicia and twenty $0.74 indicia). In response, the data center generates an appropriate number of postage data records (one for each requested indicium) and transmits them to the postage printing device where they are stored until printed, refunded or erased at a refurbishment facility. In addition, for data integrity and/or security reasons, the postage requests are digitally signed and the postage downloads are encrypted and digitally signed using symmetric cryptography and secret encryption keys that are associated with the particular postage printing device (i.e., a particular user account) and known to the postage printing device and the data center. This type of postage printing device may also be freely and independently (i.e., without the participation of or the need to get authorization from the postage provider) transferred to a new user, in which case the new user is able to use any postage data records that are stored at the time of the transfer. However, as will be appreciated, if the encryption keys are left unchanged after the transfer, the old user may be susceptible to and/or blamed for fraudulent acts committed by the new user. Thus, there is a need for a method for securing a postage printing device and an inventory of postage data records held thereby when the device is transferred among users.

SUMMARY OF THE INVENTION

The present invention relates to a method for use in a system that includes a postage printing device and a data center, wherein postage value may be downloaded to the postage printing device from the data center and wherein the postage printing device may be transferred among users. The postage printing device uses a first key to digitally sign one or more first requests for a plurality of first data records from the data center. Each of the first data records includes indicium information for enabling the postage printing device to print a postal indicium. The data center: (i) uses a second key to encrypt at least the indicium information of each of the first data records to generate a plurality of encrypted indicium information portions, (ii) uses each of the encrypted indicium information portions to form a plurality of encrypted first data records, and (iii) uses a third key to digitally sign each of the encrypted first data records to generate a plurality of data record digital signatures. The data center transmits the encrypted first data records and the data record digital signatures to the postage printing device. The postage printing device stores the third key for authenticating each of the first data records using a corresponding one of the data record digital signatures and the second key for decrypting each of the encrypted indicium information portions of each of the encrypted first data records.

The method of the present invention may be used to secure the postage printing device, and any stored postage data records, when the postage printing device is transferred from a first user to a second user. The method includes zeroing the first key in the postage printing device, and generating at the postage printing device and the data center a fourth key, a fifth key and a sixth key. The postage printing device uses the fourth key to digitally sign one or more second requests for a plurality of second data records from the data center. Each of the second data records include second indicium information for enabling the postage printing device to print a postal indicium. The data center: (i) uses the fifth key to encrypt at least the second indicium information of each of the second data records to generate a plurality of encrypted second indicium information portions, (ii) uses each of the encrypted second indicium information portions to form a plurality of encrypted second data records, and (iii) uses the sixth key to digitally sign each of the encrypted second data records.

The method further includes authenticating each of the first data records using the third key and a corresponding one of the data record digital signatures, decrypting each of the encrypted indicium information portions of each of the encrypted first data records using the second key, encrypting at least the indicium information of each of the first data records using the fifth key to generate a plurality of re-encrypted indicium information portions, and using each of the re-encrypted indicium information portions to form a plurality of re-encrypted first data records. In addition, the method includes digitally signing each of the re-encrypted first data records using the sixth key, and zeroing the second and third keys in the postage printing device.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
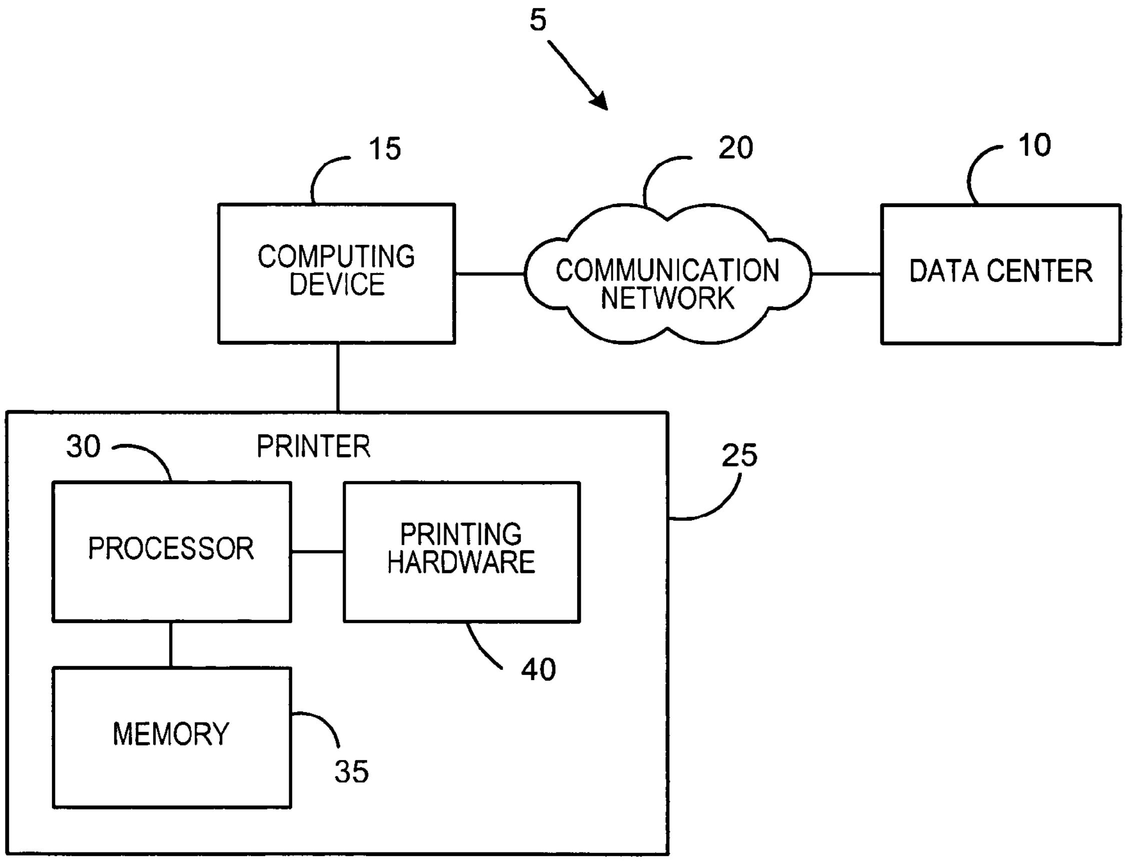
FIG. 1 is a block diagram of a mail processing system according to one particular embodiment of the present invention.

FIG. 1 is a block diagram of a mail processing system 5 according to one particular embodiment of the present invention. Mail processing system 5 includes a data center 10 that includes a suitable processing system having a computing device such as a server computer and one or more memory components for data storage. The data center 10 is in electronic communication with one or more remotely located computing devices 15 (only one computing device 15 is shown in FIG. 1 for purposes of clarity of description) over any suitable communication network 20 such as the Internet. Each computing device 15 may be, for example, a personal computer, a workstation, a laptop computer, a personal data assistant, a cell phone, or the like. Generally, it is anticipated that the computing devices 15 would be located in, for example, small business offices and/or in private residences and used for a variety of purposes, including obtaining and printing postal indicia as described herein. The data center 10 is maintained and operated by a provider such as an authorized postage meter manufacturer or some other authorized agency.

As seen in FIG. 1, computing device 15 is in electronic communication with a printer 25 that includes a processor 30, such as a microcontroller, a memory 35, and printing hardware 40, such as an ink jet print head and associated print controller, that enables the printing of postal indicia. Memory 35 may be any of a variety of internal and/or external storage media including RAM, ROM, EPROM, EEPROM, and/or the like, alone or in combination. Memory 35 stores one or more routines executable by processor 30 for the processing of data in accordance with the invention as described herein. The routines can be in any of a variety of forms such as, without limitation, software, firmware, and the like, and may include one or more subroutines, processes, procedures, function calls or the like, alone or in combination.

In the particular embodiment shown in FIG. 1, printer 25 forms part or all of a secure postage printing device that is able to print postal indicia, such as USPS IBIP closed system indicia, on a mailpiece or an adhesive label to be applied to a mailpiece. In the embodiment shown in FIG. 1, printer 25 does not include a postal security device (PSD), but instead prints indicia of specific postage denominations that were previously dispensed by an approved PSD associated with data center 10 and stored in memory 35.

In operation, a user sends a request to purchase postage from printer 25 and computing device 15 to data center 10 through communication network 20. Specifically, printer 25 generates a request for a particular number of indicia for one or more particular postage denominations (e.g., twenty $0.37 indicia and twenty $0.74 indicia). The request, before being sent to the data center 10, is digitally signed using a symmetric encryption scheme such as one using, for example and without limitation, a keyed-hash message authentication code (HMAC), using a secret key known to both printer 25 and data center 10. This key is known as a request authentication key, and enables the request for postage to be authenticated by the data center 10 (as described below, the data center also possesses the request authentication key). In response, the data center 10 generates an appropriate number of postage data records (one for each requested indicium) and securely transmits them to computing device 15 over communication network 20 (the postage data records consist of data records that include at least the data that is necessary to print a valid indicium). In particular, at least the indicium printing data of each of the postage data records are first encrypted by the data center 10 using a symmetric encryption scheme such as, for example and without limitation, 3DES2, using a secret key known to both printer 25 and data center 10. In the preferred embodiment, only the indicium printing data is encrypted. Alternatively, the entirety of each postage data record may be encrypted. The encryption key that is used is known as a response privacy key and is used to protect and secure the postage data records (in particular, the indicium printing data). Next, each of the encrypted portions of the postage data records (e.g., the indicium printing data or possibly more) along with the remaining (clear text) portions, if any, of each of the postage data records are digitally signed by the data center 10 using a symmetric encryption scheme such as one using, for example and without limitation, an HMAC, using a secret key known to both printer 25 and data center 10. This key is known as a response authentication key, and enables the postage download to be authenticated by the printer 25. As described below, the printer 25 possesses both the response privacy key and the response authentication key. By encrypting and signing the postage data records, data center 10 is able to ensure that only the particular requesting printer 25 may ultimately use the postage data records that were sent.

When received, the encrypted and signed postage data records are downloaded from the computing device 15 to the printer 25 where they are stored in memory 35 until used by the user to create an indicium that is printed on a mailpiece or a label. In one embodiment, each of the postage data records is authenticated by the printer using the digital signature and the response authentication key at the time of download. Alternatively, each postage data record may be authenticated when the indicia associated with it is printed. Once the postage data records are stored in memory 35, printer 25 may be detached from computing device 15 and used as a stand alone postage dispensing device. Preferably, the encrypted indicium data of each postage printing record is decrypted, using the response privacy key, at the time of printing. Thus, in the mail processing system 5 shown in FIG. 1, printer 25 performs the postage printing function only, and postage dispensing and accounting functions are performed by data center 10.

Figure 2A:
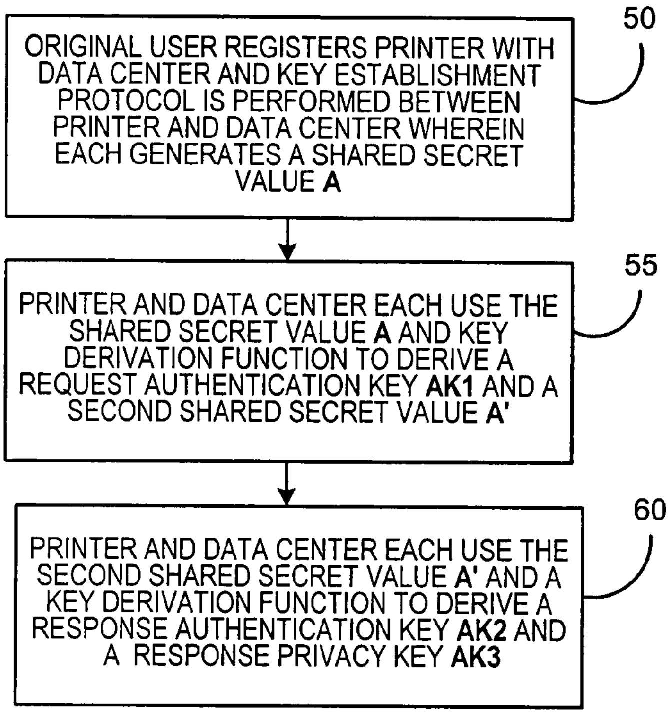
FIGS. 2A and 3A are flowcharts showing a method for managing the encryption keys used by the mail processing system shown in FIG. 1.
Figure 3A:
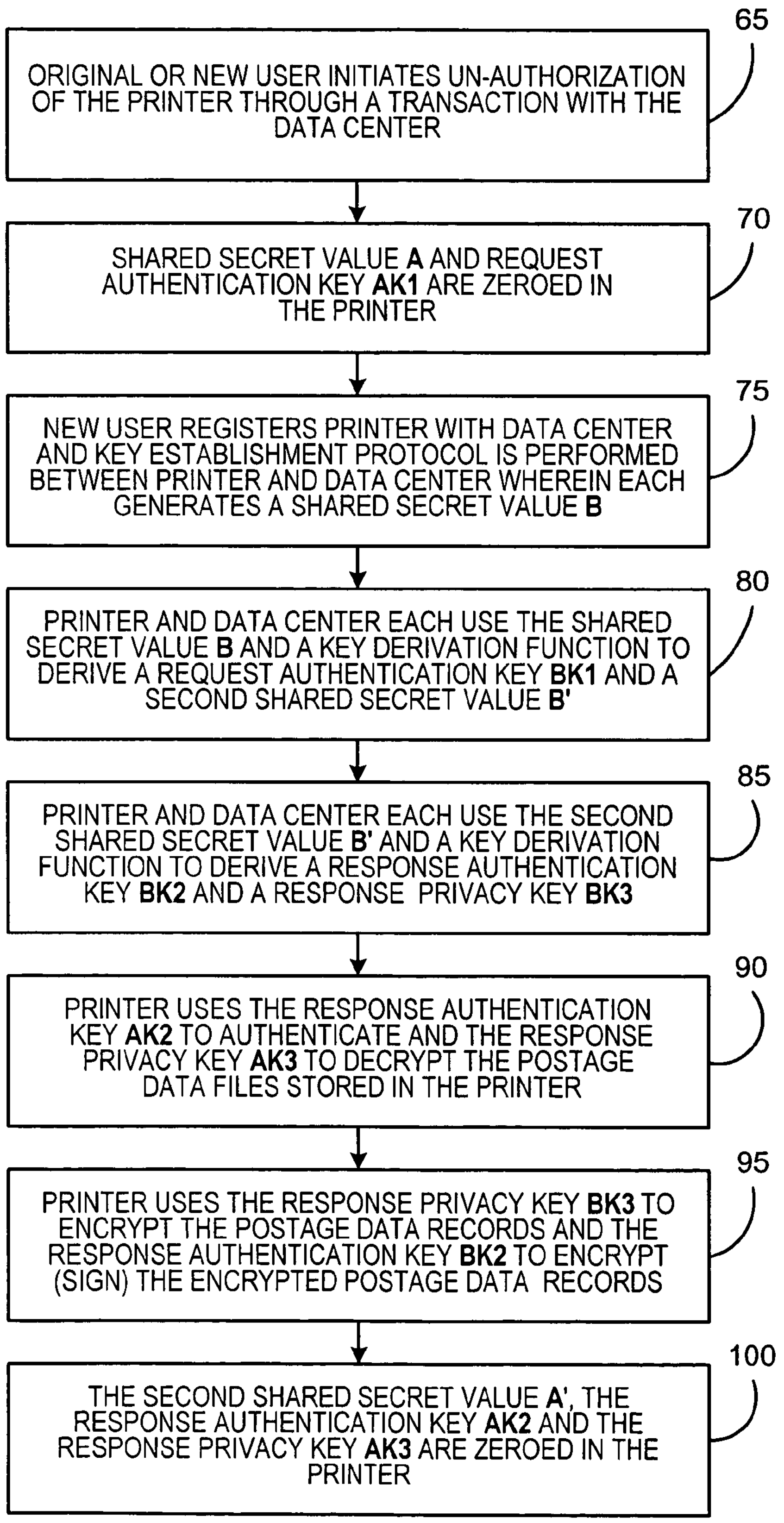

FIGS. 2A and 3A are flowcharts showing a method for managing the encryption keys used by mail processing system 5 in order to secure the printer 25 and the inventory of postage data records stored thereby when the printer 25 is transferred from one user to another. Specifically, FIG. 2A is a flowchart showing a method by which an original user A of printer 25 registers with the data center 10 and obtains the required encryption keys. FIG. 3A is a flowchart showing a method for transferring the printer 25 from one user, referred to as user U1 (the original user of printer 25 for illustrative purposes), to a new user, referred to as user U2, according to the present invention.

Figure 2B:
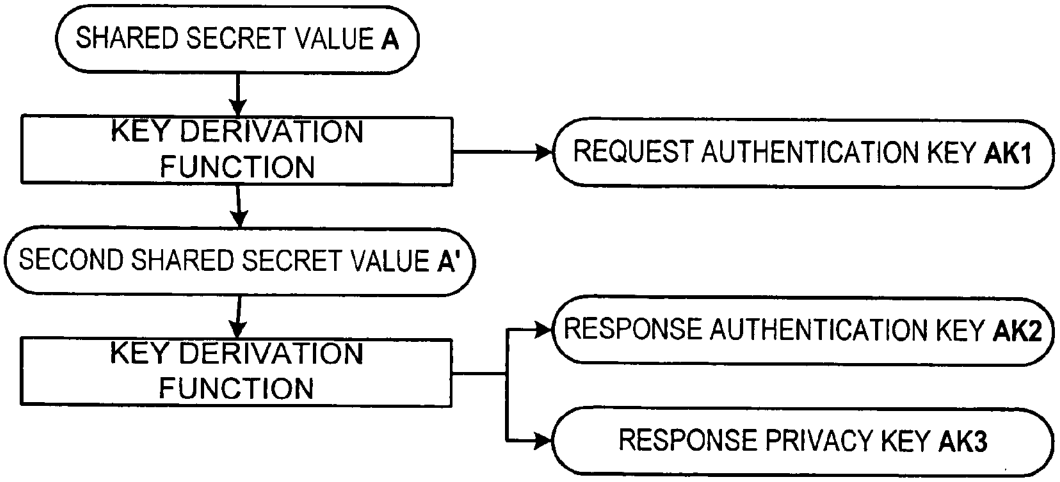
FIGS. 2B and 3B are schematic representations of the process by which encryption keys are generated according to one particular embodiment of the present invention.

As seen in step 50 in FIG. 2A, before the original user U1 may use the printer 25, the original user U1 registers the printer 25 with the data center 10. During the registration process, a key establishment protocol is performed between the printer 25 and the data center 10 over network 20 resulting in the secure generation of a shared secret value A for U1 that is known to both the printer 25 and the data center 10. Any known key establishment protocol may be used, such as the Key Agreement Protocol specified in ANSI X 9.63. Next, at step 55, the printer 25 and the data center 10 each use the shared secret value A and a key derivation function, such as, without limitation, the one specified in ANSI x 9.63, to derive a request authentication key AK1 and a second shared secret value A'. In one embodiment, the request authentication key AK1 is a 20 byte HMAC secret key. Then, at step 60, the printer 25 and the data center 10 each use the second shared secret value A' and a key derivation function, such as, without limitation, the one specified in ANSI x 9.63, to derive a response authentication key AK2 and a response privacy key AK3. At this point, the printer 25 has all of the keys that are needed to request, download and print indicia for user U1. FIG. 2B is a schematic representation of the process by which the keys are generated.

Figure 3B:
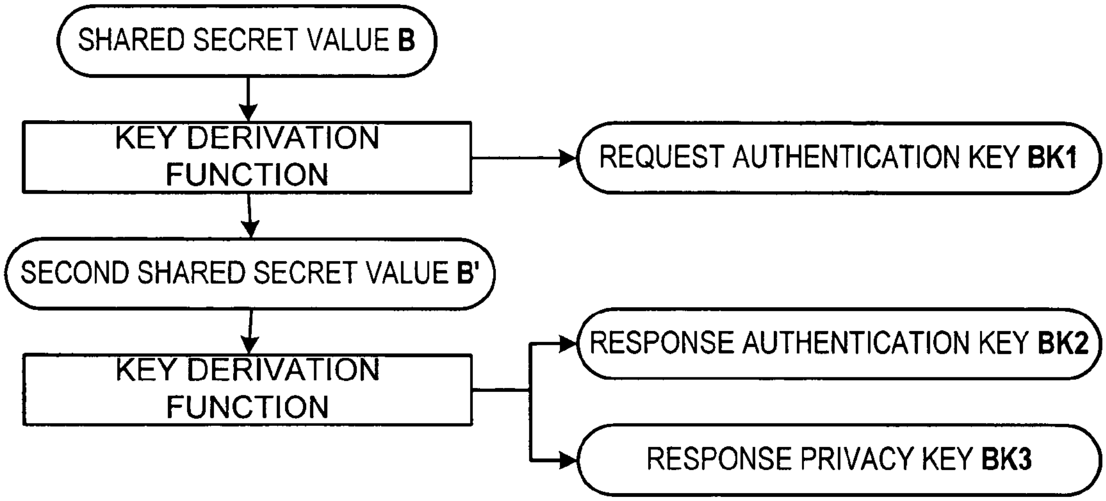

Referring to FIG. 3A, when the printer 25 is to be transferred to the new user U2, the user U1 or U2 first initiates the un-authorization of the printer 25 through a transaction with the data center 10 over network 20 as seen in step 65. Once this is done, at step 70, the shared secret value A and the request authentication key AK1 for user U1 are zeroed in the printer 25, i.e., scrubbed from the memory 35, so that they may not be used in the future. Next, at step 75, user U2 registers the printer 25 with the data center 10, during which time a key establishment protocol as described above is performed between the printer 25 and the data center 10 over network 20 resulting in the secure generation of a shared secret value B for user U2 that is known to both the printer 25 and the data center 10. Next, at step 80, the printer 25 and the data center 10 each use the shared secret value B and a key derivation function as described above to derive a request authentication key BK1 and a second shared secret value B'. Then, at step 85, the printer 25 and the data center 10 each use the second shared secret value B' and a key derivation function as described above to derive a response authentication key BK2 and a response privacy key BK3. At this point, the printer 25 has a set of new keys, BK1, BK2, and BK3, that can to be used to request, download and print indicia for user U2. FIG. 3B is a schematic representation of the process by which the keys are generated.

At step 90, the printer 25 uses the response authentication key AK2 (that it still has stored in memory) to authenticate and the response privacy key AK3 to decrypt the encrypted portions of postage data records that are currently stored by the printer in memory 35 (these records were downloaded previously by user U1). Next, at step 95, the printer 25 uses the response privacy key BK3 to encrypt at least a portion (e.g., the indicium printing data) of each of the decrypted (clear-text) postage data records and the response authentication key BK2 to digitally sign each of the encrypted portions and any remaining portions of the postage data records. Finally, at step 100, the second shared secret value A', the response authentication key AK2, and the response privacy key AK3 are zeroed in the printer 25, i.e., scrubbed from the memory 35. Thus, as a result of these operations, all information relating to the previous user U1 is removed from the memory 35, thereby protecting the user U1 from theft and/or fraud on the part of user U2.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of securely transferring first data records stored in a postage printing device from a first user to a second user when said postage printing device is transferred from said first user to said second user, said postage printing device using a first key to digitally sign one or more first requests for a plurality of said first data records from a data center, each of said first data records including indicium information for enabling said postage printing device to print a postal indicium, said data center using a second key to encrypt at least the indicium information of each of said first data records to generate a plurality of encrypted indicium information portions, using each of said encrypted indicium information portions to form a plurality of encrypted first data records, and using a third key to digitally sign each of said encrypted first data records to generate a plurality of data record digital signatures, said data center transmitting said encrypted first data records and said data record digital signatures to said postage printing device, said postage printing device storing said third key for authenticating each of said first data records using a corresponding one of said data record digital signatures and said second key for decrypting each of said encrypted indicium information portions of each of said encrypted first data records, the method comprising:

- zeroing, by said postage printing device, said first key in said postage printing device;
- generating, by said postage printing device and said data center, a fourth key, a fifth key and a sixth key, said postage printing device using said fourth key to digitally sign one or more second requests for a plurality of second data records from said data center, wherein each of said second data records include second indicium information for enabling said postage printing device to print a postal indicium, wherein said data center uses said fifth key to encrypt at least the second indicium information of each of said second data records to generate a plurality of encrypted second indicium information portions, using each of said encrypted second indicium information portions to form a plurality of encrypted second data records, and using said sixth key to digitally sign each of said encrypted second data records;

authenticating, by said postage printing device, each of said first data records using said third key and a corresponding one of said data record digital signatures;

decrypting, by said postage printing device, each of said encrypted indicium information portions of each of said encrypted first data records using said second key;

encrypting, by said postage printing device, at least the indicium information of each of said first data records using said fifth key to generate a plurality of re-encrypted indicium information portions, and using each of said re-encrypted indicium information portions to form a plurality of re-encrypted first data records;

digitally signing, by said postage printing device, each of said re-encrypted first data records using said sixth key; and zeroing, by said postage printing device, said second and third keys in said postage printing device.

2. The method according to claim 1, wherein said postage printing device and said data center use a first shared secret value for said first user to generate said first key and a second shared secret value for said first user to generate said second and third keys, said step of zeroing said first key including zeroing said first shared secret value for said first user in said postage printing device, said step of zeroing said second and third keys including zeroing said second shared secret value for said first user in said postage printing device, the method further comprising generating a first shared secret value for said second user at said postage printing device and said data center, and using said first shared secret value for said second user to generate a second shared secret value for said second user at said postage printing device and said data center, wherein said fourth key is generated using said first shared secret value for said second user and said fifth and sixth keys are generated using said second shared secret value for said second user.

3. The method according to claim 2, wherein said first shared secret value for said second user, said second shared secret value for said second user, and said fourth, fifth and sixth keys are generated according to ANSI X 9.63.

4. A method of transferring a postage printing device from a first user to a second user, said postage printing device and a data center having a first set of keys for use by said first user in requesting and downloading a plurality of first data records from said data center, each of said first data records including indicium information for enabling said postage printing device to print a postal indicium, the method comprising:

zeroing, by said postage printing device, a first key of said first set of keys in said postage printing device, said first key being used by said postage printing device to request said first data records;

generating, by said postage printing device and said data center, a second set of keys, said second set of keys for use by said second user in requesting and downloading a plurality of second data records from said data center, each of said second data records including second indicium information for enabling said postage printing device to print a postal indicium, authenticating, by said postage printing device, each of said first data records using a second key of said first set of keys;

decrypting, by said postage printing device, encrypted portions of each of said first data records using a third key of said first set of keys;

encrypting, by said postage printing device, at least the indicium information of each of said first data records using a first key of said second set of keys; and zeroing, by said postage printing device, said second and third keys of said first set of keys in said postage printing device.

* * * * *